United States Patent
Funakoshi et al.

(10) Patent No.: US 9,963,384 B1
(45) Date of Patent: May 8, 2018

(54) AQUEOUS BINDER FOR INORGANIC-FIBER HEAT-INSULATING SOUND-ABSORBING MEMBER, AND INORGANIC-FIBER HEAT-INSULATING SOUND-ABSORBING MEMBER

(71) Applicant: Asahi Fiber Glass Co., Ltd., Chiyoda-ku, Tokyo (JP)

(72) Inventors: Nami Funakoshi, Tokyo (JP); Ippei Izumi, Tokyo (JP); Yoshitomo Ishiguro, Tokyo (JP); Takeshi Endo, Fukuoka (JP)

(73) Assignee: ASAHI FIBER GLASS CO., LTD., Tokyo (JP)

( * ) Notice: Subject to any disclaimer, the term of this patent is extended or adjusted under 35 U.S.C. 154(b) by 0 days. days.

(21) Appl. No.: 15/600,262

(22) Filed: May 19, 2017

(51) Int. Cl.
| | |
|---|---|
| *D06M 15/263* | (2006.01) |
| *C09D 133/02* | (2006.01) |
| *C03C 25/28* | (2018.01) |
| *D04H 1/587* | (2012.01) |
| *D04H 1/4218* | (2012.01) |
| *C09J 125/08* | (2006.01) |

(52) U.S. Cl.
CPC ........... *C03C 25/285* (2013.01); *C09J 125/08* (2013.01); *D04H 1/4218* (2013.01); *D04H 1/587* (2013.01)

(58) Field of Classification Search
CPC .. C03C 25/285; D06M 13/368; D06M 15/263
See application file for complete search history.

(56) References Cited

FOREIGN PATENT DOCUMENTS

| | | |
|---|---|---|
| JP | 2007-211161 A | 8/2007 |
| JP | 2013-117083 A | 6/2013 |
| JP | 2013-151777 A | 8/2013 |
| JP | 5997827 B | 9/2016 |
| JP | 6017079 B1 | 10/2016 |

OTHER PUBLICATIONS

Machine translation of JP2013151777A.*
Machine translation of WO2015059881A.*

* cited by examiner

*Primary Examiner* — Vu A Nguyen
(74) *Attorney, Agent, or Firm* — Kilpatrick Townsend & Stockton LLP

(57) ABSTRACT

Disclosed is an aqueous binder for an inorganic-fiber heat-insulating sound-absorbing member, comprising a polycarboxylic acid and a crosslinking agent for the polycarboxylic acid, in which the polycarboxylic acid comprises a polycarboxylic acid having a weight average molecular weight of 1000 to 20000 and an acid value of 500 to 900 mgKOH/g; the crosslinking agent comprises a branched polyethyleneimine having a weight average molecular weight of 300 to 2000, and an alkanolamine having a lower molecular weight than the polyethyleneimine and an alcohol valence of 2 or less; the ratio of the total mole of a hydroxyl group, an amino group and an imino group in the crosslinking agent relative to the mole of a carboxy group in the polycarboxylic acid is 0.30 to 0.75; and the ratio of the total mole of the amino group and imino group in the crosslinking agent relative to the total mole of the hydroxyl group, amino group and imino group in the crosslinking agent is 0.34 to 0.80.

5 Claims, No Drawings

AQUEOUS BINDER FOR INORGANIC-FIBER HEAT-INSULATING SOUND-ABSORBING MEMBER, AND INORGANIC-FIBER HEAT-INSULATING SOUND-ABSORBING MEMBER

TECHNICAL FIELD

The present invention relates to an aqueous binder for an inorganic-fiber heat-insulating sound-absorbing member and an inorganic-fiber heat-insulating sound-absorbing member.

BACKGROUND

Inorganic-fiber heat-insulating sound-absorbing members such as glass wool and rock wool are generally produced by applying a binder to an inorganic fiber and curing the binder. As the binder, a phenol resin and an aqueous binder are known, and the binders described in Patent Literature 1 (Japanese Unexamined Patent Publication No. 2013-117083) are known as the latter one.

SUMMARY

When a phenol resin is used as a binder, there is a risk of generating formaldehyde during and after curing, and a formaldehyde-free binder is frequently desired for reducing an environmental burden.

As to the aqueous binder, a formaldehyde-free aqueous binder is known; however, if a thick inorganic-fiber heat-insulating sound-absorbing member is produced in order to enhance heat insulating performance, the surface part of the inorganic-fiber heat-insulating sound-absorbing member results in serving as a heat insulating layer, with the result that heating at the center portion of the inorganic-fiber heat-insulating sound-absorbing member tends to be insufficient. As a result, the curing degree of the binder at the center portion of the inorganic-fiber heat-insulating sound-absorbing member becomes insufficient, and thus a problem that the inorganic-fiber heat-insulating sound-absorbing members finally obtained varies in quality such as compressive strength and durability is raised.

In the circumstances, an object of the present invention is to provide an aqueous binder generating no formaldehyde in a curing step and providing excellent compressive strength and durability to the inorganic-fiber heat-insulating sound-absorbing member after curing, and provide an inorganic-fiber heat-insulating sound-absorbing member using the aqueous binder.

The present invention provides an aqueous binder for an inorganic-fiber heat-insulating sound-absorbing member comprising a polycarboxylic acid and a crosslinking agent for the polycarboxylic acid, in which (1) the polycarboxylic acid comprises a polycarboxylic acid having a weight average molecular weight of 1000 to 20000 and an acid value of 500 to 900 mgKOH/g, (2) the crosslinking agent comprises a branched polyethyleneimine having a weight average molecular weight of 300 to 2000, and an alkanolamine having a lower molecular weight than the polyethyleneimine and an alcohol valence of 2 or less, (3) the ratio of the total mole of a hydroxyl group, an amino group and an imino group in the crosslinking agent relative to the mole of a carboxy group in the polycarboxylic acid is 0.30 to 0.75, and (4) the ratio of the total mole of the amino group and imino group in the crosslinking agent relative to the total mole of the hydroxyl group, amino group and imino group in the crosslinking agent is 0.34 to 0.80.

Since the aqueous binder of the present invention comprises a polycarboxylic acid and a crosslinking agent and has characteristics of (1) to (4) as mentioned above, the aqueous binder is cured without generating formaldehyde in a curing step, with the result that an inorganic-fiber heat-insulating sound-absorbing member excellent in compressive strength and durability can be produced.

To describe more specifically, the aqueous binder of the present invention is cured by the reaction between a polycarboxylic acid and a curing agent as mentioned above and thus the reaction proceeds without releasing formaldehyde during thermal curing, with the result that an environmental load in view of e.g., exhaust gas, can be reduced. Furthermore, since the polyethyleneimine having a weight average molecular weight falls within the above range is used, thermal curing of the binder can be smoothly carried out and also the crosslinking reaction is sufficiently improved, with the result that a crosslinking density can be increased. Furthermore, since the mole of a functional group capable of reacting with a carboxy group in the crosslinking agent relative to the mole of the carboxy group is specified to fall within the aforementioned range, the polycarboxylic acid and the crosslinking agent can be reacted in just proportion, with the result that a rigid cured product of the binder can be obtained and physical properties of the inorganic-fiber heat-insulating sound-absorbing member are improved. Moreover, since the mole of an amino group and an imino group relative to the total mole of the hydroxyl group, amino group and imino group in the crosslinking agent is specified to fall within the above range, curing of the binder proceeds at a high rate, with the result that an inorganic-fiber heat-insulating sound-absorbing member having excellent characteristics can be produced without increasing the temperature of a curing oven and increasing the time for a curing step.

A large number of formaldehyde-free binders have a composition for forming an ester bond in thermal curing. In the esterification reaction, since condensation proceeds while removing water, the reaction rate is low. For the reason, it is necessary to enhance the curing degree of the binder, for example, by increasing the temperature during curing and/or increasing the heating time. Because of this, a decrease in productivity and economic efficiency are problems. In the meantime, a thermosetting binder, in which an amino group and/or an imino group and a carboxy group are reacted is also proposed (e.g., Patent Literature 1). However, since the hydrophilicity of an amide group or an imide group produced after curing is high, the binder significantly deteriorates due to humidity of the resultant inorganic-fiber heat-insulating sound-absorbing member and bulge of the inorganic-fiber heat-insulating sound-absorbing member due to humidity is sometimes produced. Because of this, the strength of the member as a plate material deteriorates. The aqueous binder of the present invention has overcome these drawbacks and is particularly useful in producing inorganic-fiber heat-insulating sound-absorbing members.

It is preferable that the polycarboxylic acid is that comprising as a monomer unit an ethylenically unsaturated monomer having a carboxy group. One of the characteristics of the aqueous binder of the present invention, as described above, is using a high molecular weight polycarboxylic acid, a medium-molecular-weight branched polyethyleneimine and a low molecular-weight alkanol imine in combination, and using a polycarboxylic acid obtained by polymerizing the ethylenically unsaturated monomer having a carboxy group, the amount of carboxy group per molecule can be increased and the weight average molecular weight can be easily controlled by combined use with a suitable chain transfer agent. Accordingly, the function as an aqueous binder can be improved by using such a polycarboxylic acid (e.g., crosslinking efficiency and crosslink density are improved due to a large number of carboxy group per molecule); at the same time, variation in performance can be reduced.

It is preferable that the alkanolamine is a dialkanolamine having alkanol moieties, each of the alkanol moieties consisting of 1 to 6 carbon atoms. Since the number of carbon atoms of each of alkanols to be bound to an amine is as low as 1 to 6, if the dialkanolamine is used in combination with a polycarboxylic acid and a polyethyleneimine, compressive strength and durability can be further improved.

The aqueous binder can comprise at least one agent selected from the group consisting of a curing accelerator, a silane coupling agent, a dust-inhibiting agent, a neutralizing agent and a colorant. If such a material is added, performance of the aqueous binder can be adjusted in accordance with a curing step and materials to be used (e.g., inorganic fibers), with the result that a composition suitable for final use can be obtained.

If such an aqueous binder is used, an inorganic-fiber heat-insulating sound-absorbing member improved in compressive strength and durability can be obtained. More specifically, an inorganic-fiber heat-insulating sound-absorbing member having an inorganic fiber and a cured product of the aqueous binder fixing the inorganic fiber is provided.

The inorganic-fiber heat-insulating sound-absorbing member is free from dimensional change in thickness of a heat insulating material involved in heat-insulating sound-absorbing performance and free from deterioration of rigidity involved in self-standing during construction, even if environmental conditions such as temperature or humidity change, and has physical properties equivalent or superior to the members using a conventional phenolic binder. Thus the inorganic-fiber heat-insulating sound-absorbing member can be suitably used as a core material for a heat-insulating material, a sound-absorbing material or a vacuum insulating material for houses and buildings.

According to the present invention, it is possible to provide an aqueous binder generating no formaldehyde in a curing step and providing excellent compressive strength and durability to the inorganic-fiber heat-insulating sound-absorbing member after curing; and provide an inorganic-fiber heat-insulating sound-absorbing member using the aqueous binder.

DETAILED DESCRIPTION

Now, a preferred embodiment of the present invention will be described below. However, the present invention is not particularly limited to the embodiment.

The aqueous binder for an inorganic-fiber heat-insulating sound-absorbing member according to the embodiment (hereinafter sometimes simply referred to as "aqueous binder") comprises a polycarboxylic acid. As the polycarboxylic acid, a polycarboxylic acid having a weight average molecular weight of 1000 to 20000 and an acid value of 500 to 900 mgKOH/g (hereinafter referred to as "high molecular weight polycarboxylic acid") is comprised as an essential component. Note that, the weight average molecular weight is a value in terms of polystylene measured by gel permeation chromatography (GPC); and the acid value refers to milligrams (mgKOH) of potassium hydroxide required for neutralizing 1 g of polycarboxylic acid.

As the polycarboxylic acid, it is not excluded to comprise a polycarboxylic acid other than the high molecular weight polycarboxylic acid (for example, a polycarboxylic acid having a weight average molecular weight outside the range of 1000 to 20000 or a polycarboxylic acid having an acid value outside the range of 500 to 900 mgKOH/g); however, the content of the high molecular weight polycarboxylic acid in the whole amount of polycarboxylic acids is preferably 90 mass % or more, further preferably 95 mass % or more and may be 100 mass %.

It is preferable that the high molecular weight polycarboxylic acid is a polymer comprising as a monomer unit an ethylenically unsaturated monomer having a carboxy group, more specifically, a polymer obtained by polymerizing an ethylenically unsaturated monomer having a carboxy group. Note that ethylenically unsaturated monomers having a carboxy group can be used singly or in combination of two or more. The monomer units constituting the high molecular weight polycarboxylic acid include a case consisting of only an ethylenically unsaturated monomer having a carboxy group and a case consisting of an ethylenically unsaturated monomer having a carboxy group and a copolymerization monomer having no carboxy group. In the latter case, the content of the ethylenically unsaturated monomer having a carboxy group based on the total amount of monomers is preferably 90 mass % or more and further preferably 95 mass % or more.

Examples of the ethylenically unsaturated monomer having a carboxy group include (meth)acrylic acid, crotonic acid, fumaric acid, maleic acid, 2-methylmaleic acid, itaconic acid, 2-methylitaconic acid, α-β-methyleneglutaric acid, monoalkyl maleate, monoalkyl fumarate, maleic anhydride, acrylic anhydride, β-(meth)acryloyloxyethylene hydrogen phthalate, β-(meth)acryloyloxyethylene hydrogen maleate and β-(meth)acryloyloxyethylene hydrogen succinate. Of these, (meth)acrylic acid is preferably used since the molecular weight of polycarboxylic acid is easily controlled, and acrylic acid is particularly preferable. In the case where the acid value of the polycarboxylic acid is controlled to be 700 mgKOH/g or more, maleic acid or fumaric acid is preferably used. Note that, "(meth)acryl" means acryl or methacryl and the same applies to analogous compounds.

Examples of the copolymerization monomer having no carboxy group include acrylic monomers such as methyl (meth)acrylate, ethyl (meth)acrylate, normal-butyl (meth)acrylate, isobutyl (meth)acrylate, tert-butyl (meth)acrylate, 2-ethylhexyl (meth)acrylate, cetyl (meth)acrylate, normal stearyl (meth)acrylate, diethylene glycol ethoxy (meth)acrylate, methyl-3-methoxy (meth)acrylate, ethyl-3-methoxy (meth)acrylate, butyl-3-methoxy (meth)acrylate, cyclohexyl (meth)acrylate, benzyl (meth)acrylate, isobornyl (meth)acrylate, tetrahydrofurfuryl acrylate, 2-hydroxyethyl acrylate, 2-hydroxypropyl acrylate, 4-hydroxybutyl acrylate, trihydric or more polyol mono(meth)acrylate, an aminoalkyl (meth)acrylate, a N-alkylaminoalkyl (meth)acrylate and a N,N-dialkylaminoalkyl (meth)acrylate; vinyl monomers such as a vinyl alkyl ether, a N-alkyl vinyl amine, a N,N-dialkyl vinyl amine, N-vinylpyridine, N-vinylimidazole and a N-(alkyl)aminoalkyl vinyl amine; amide monomers such as a (meth)acrylamide, N-alkyl (meth)acrylamide, a N,N-dialkyl (meth)acrylamide, a N,N-dialkylaminoalkyl (meth)acrylamide, a diacetone (meth)acrylamide, a N-vinylformamide, N-vinylacetamide and N-vinylpyrrolidone; aliphatic unsaturated hydrocarbons such as ethylene, propylene, isobutylene, isoprene and butadiene; styrene monomers such as styrene, α-methylstyrene, p-methoxystyrene, vinyltoluene, p-hydroxystyrene and p-acetoxystyrene; vinyl ester type monomers such as vinyl acetate and vinyl propionate; acrylonitrile; and glycidyl (meth)acrylate. These can be used singly or in combination of two or more.

The acid value of the high molecular weight polycarboxylic acid is 500 to 900 mgKOH/g and preferably 550 to 750 mgKOH/g. If the acid value of the polycarboxylic acid falls within the range of numerical values, the strength and rigidity of a cured product of the binder are improved and thickness recovery after unpacking the resultant inorganic-fiber heat-insulating sound-absorbing member from a compressed state and rigidity of the inorganic-fiber heat-insulating sound-absorbing member processed in the form of board are improved. In addition, heat insulating property, sound absorbability or workability at the time of construction such as self-standing property is excellent.

The weight average molecular weight of a high molecular weight polycarboxylic acid is 1000 to 20000, preferably 2000 to 15000 and more preferably 2000 to 10000. If the weight average molecular weight of a polycarboxylic acid falls within the range of numerical values, it is easy to control the fluidity of the aqueous binder to be one suitably applicable to an inorganic fiber and variation of the aqueous binder in the application amount can be suppressed. In producing an inorganic-fiber heat-insulating sound-absorbing member, an aqueous binder is often applied to a fiber immediately after fiberization in accordance with e.g., a centrifugation method, in a high temperature atmosphere of about 200 to 350° C. At this time, the water content in the aqueous binder can be satisfactorily vaporized.

The weight average molecular weight of a polycarboxylic acid is related to not only the fluidity of the aqueous binder but also a curing rate and a crosslink density after curing. Even if polycarboxylic acids have the same acid value, if the molecular weights differ, the curing rates of the binders and the strength of cured products of the binders change and the physical properties of the resultant inorganic-fiber heat-insulating sound-absorbing members also change. For example, as the weight average molecular weight of a polycarboxylic acid decreases, the curing rate of the aqueous binder increases; however, the cured product tends to be fragile. Depending upon the production conditions of a production line, there are cases where desired physical properties are not obtained. If the weight average molecular weight of a polycarboxylic acid falls within the above range, the fluidity of the aqueous binder and the physical properties of the resultant inorganic-fiber heat-insulating sound-absorbing member can be optimally balanced.

The content (in terms of solid content) of a polycarboxylic acid in an aqueous binder is preferably 70 to 90 mass % and more preferably 75 to 86 mass % on a total mass basis of the aqueous binder in terms of solid content.

The aqueous binder comprises a crosslinking agent other than a polycarboxylic acid as mentioned above. As the crosslinking agent, a branched polyethyleneimine having a weight average molecular weight of 300 to 2000 (hereinafter sometimes referred to as "branched polyethyleneimine") and an alkanolamine having a lower molecular weight than the polyethyleneimine and having an alcohol valence of 2 or less (hereinafter sometimes referred to as "low molecular weight alkanolamine") are comprised as essential components. As the crosslinking agent, the content of components except the essential components is not excluded; however, the total content of a branched polyethyleneimine and a low molecular weight alkanolamine in the total amount of the crosslinking agent is preferably 90 mass % or more and further preferably 95 mass % or more and may be 100 mass %.

The branched polyethyleneimine is obtained by polymerization of ethyleneimine and is a branched aqueous resin having an amino group at an end of the molecule or an imino group or an amino group within the molecule, which are formed depending upon a polymerization catalyst and polymerization conditions.

The weight average molecular weight of the branched polyethyleneimine is 300 to 2000, preferably 500 to 1800 and more preferably 600 to 1200. Also in the case of the branched polyethyleneimine, similar to a polycarboxylic acid, the molecular weight thereof influences the fluidity and curing behavior of an aqueous binder. If the weight average molecular weight of the polyethyleneimine falls within the above range, the fluidity of the aqueous binder and the physical properties of the resultant inorganic-fiber heat-insulating sound-absorbing member can be optimally balanced. In addition, since an amino group or imino group in a polyethyleneimine tends to more quickly react with a carboxy group than a hydroxyl group, if the weight average molecular weight falls within the range of the above numerical values, the branched polyethyleneimine quickly reacts with a polycarboxylic acid, raising the rate of increasing the molecular weight of a cured product of the binder and raising the strength of the cured product of the binder.

The amine value of a branched polyethyleneimine is preferably 850 to 1150 mgKOH/g and more preferably 1000 to 1130 mgKOH/g. Note that, the amine value can be obtained in accordance with JIS K7237.

The content (in terms of solid content) of a branched polyethyleneimine in an aqueous binder is preferably 0.3 to 20 mass % and more preferably 0.5 to 15 mass % on a total mass basis of the aqueous binder in terms of solid content.

The low-molecular weight alkanolamines are compounds having an amino group or imino group and a hydroxyl group and roughly classified into monoalkanolamines and dialkanolamines. The low-molecular weight alkanolamine may be a mixture of a monoalkanolamine and a dialkanolamine. As a low-molecular weight alkanolamine, a dialkanolamine having alkanol moieties, each of the alkanol moieties consisting of 1 to 6 carbon atoms is mentioned and a dialkanolamine having alkanol moieties, each of the alkanol moieties consisting of 1 to 3 carbon atoms is preferably used. Examples of dialkanolamine having alkanol moieties each consisting of 1 to 6 carbon atoms include diethanolamine and diisopropanolamine, and diethanolamine is preferable in view of a reaction rate with a polycarboxylic acid and compressive strength and durability of a cured product of the binder.

The ratio of the total mole of the hydroxyl group, amino group and imino group in the crosslinking agent relative to the mole of the carboxy group in a polycarboxylic acid is 0.30 to 0.75, preferably 0.40 to 0.70 and more preferably 0.45 to 0.65. If the molar ratio falls within the range of the numerical values, the polycarboxylic acid and the crosslinking agent easily form a crosslinking structure in just proportion, with the result that the strength of a cured product of the binder increases and the physical properties of the resultant inorganic-fiber heat-insulating sound-absorbing member become optimal.

The ratio of the total mole of the amino group and imino group in the crosslinking agent relative to the total mole of the hydroxyl group, amino group and imino group in the crosslinking agent is 0.34 to 0.80, preferably 0.34 to 0.65, more preferably 0.34 to 0.60. If the molar ratio falls within the range of the numerical values, a high-molecular weight polycarboxylic acid and a crosslinking agent components, i.e., a branched polyethyleneimine and a low-molecular weight alkanolamine, quickly form a crosslinking structure. Since formation of an amide group and an imide group, which has an unfavorable effect upon water resistance, is suppressed, a change in the curing degree due to curing conditions is minor, with the result that the water resistance of the resultant inorganic-fiber heat-insulating sound-absorbing member is not impaired and mechanical strength and the dimension of an insulating material can be ensured.

The content (in terms of solid content) of a low-molecular weight alkanolamine in an aqueous binder is preferably 3 to 25 mass % and more preferably 5 to 20 mass % on a total mass basis of the aqueous binder in terms of solid content.

As described above, the aqueous binder obtained by blending a polycarboxylic acid and a crosslinking agent does not produce formaldehyde during curing and provides a cured product having excellent compressive strength and durability.

The aqueous binder may comprise a cure accelerator such as a reductive inorganic salt. Examples of the cure accelerator include a hypophosphite and a sulfite. These may be used singly or in combination of two or more. Examples of the hypophosphite include sodium hypophosphite, lithium hypophosphite, potassium hypophosphite, calcium hypophosphite, magnesium hypophosphite and strontium hypophosphite. Examples of the sulfite include lithium hydrogen sulfite, sodium hydrogen sulfite, potassium hydrogen sulfite, magnesium hydrogen sulfite, calcium hydrogen sulfite and ammonium hydrogen sulfite. Of them, lithium hydrogen sulfite, sodium hydrogen sulfite or ammonium hydrogen sulfite, which has a high content of a sulfite ion having a curing acceleration action, is preferable.

The content of the cure accelerator relative to the total (100 parts by mass) of a polycarboxylic acid and a crosslinking agent is preferably 0.1 to 10 parts by mass and more preferably 0.5 to 5 parts by mass in terms of solid content.

It is preferable that the aqueous binder comprises a silane coupling agent. The silane coupling agent acts at the interface between an inorganic fiber and a cured product of the binder, with the result that adhesion of the cured product of the binder to the inorganic fiber can be improved. Examples of the silane coupling agent include aminosilane coupling agents such as γ-aminopropyltriethoxysilane, γ-(2-aminoethyl)aminopropyltrimethoxysilane and γ-(2-aminoethyl)aminopropylmethyldimethoxysilane; and epoxysilane coupling agents such as γ-glycidoxypropyltrimethoxysilane and γ-glycidoxypropylmethyldimethoxysilane. These may be used singly or in combination of two or more.

The content of the silane coupling agent relative to the total of 100 parts by mass of a polycarboxylic acid and a crosslinking agent is preferably 0.1 to 2.0 parts by mass in terms of solid content.

To the aqueous binder, if necessary, for example, an inorganic sulfate (neutralizing agent) for neutralizing an alkaline component(s) eluted from a heavy oil dispersant as a dust-inhibiting agent, a colorant and an inorganic fiber such as glass, and other additives can be further added. As the inorganic sulfate, for example, ammonium sulfate can be mentioned.

The pH of the aqueous binder is preferably 6.0 to 8.0, more preferably 6.0 to 7.0 and further preferably 6.0 to 6.5. If the pH falls within the range of numerical values, corrosion of production equipment can be suppressed and wastewater can be easily treated, with the result that maintenance cost can be reduced. It is preferable that the pH is adjusted by use of a volatile basic compound. Examples of the volatile basic compound include ammonia water and an amine. In consideration of odor generating during curing, ammonia water is preferable.

The aqueous binder can be produced, for example, by the following method. More specifically, the above polycarboxylic acid and crosslinking agent, and, if necessary, a cure accelerator, a silane coupling agent, a heavy oil dispersant in water and other additives are added in a tank equipped with a stirrer such as a dissolver and then just mixed.

As the form of the aqueous binder, an emulsion, a colloidal dispersion and a water soluble composition are mentioned. Any form may be employed. The emulsion herein refers to an emulsion obtained by using an emulsifier, for example, a surfactant, which is different from a resin component (high molecular weight polycarboxylic acid) comprised in the aqueous binder. The colloidal dispersion refers to a dispersion obtained by dispersing a resin component in water with the help of a functional group comprised in the resin component. Generally, both have milk-white color appearance. In contrast, a water soluble composition refers to a composition obtained by dissolving a resin component in water and having transparent or nearly transparent appearance.

As the form of the aqueous binder, as will be described below, a water soluble composition is advantageous over an emulsion or a colloidal dispersion, since process management is easy. More specifically, in the emulsion and colloidal dispersion, the resin component (e.g., a high molecular weight polycarboxylic acid) dispersed therein is less soluble in water and less swellable and easily forms a film when water serving as a medium volatilizes. If the resin component in the aqueous binder forms a film before curing, the fluidity of the binder in the surface of an inorganic fiber tends to be impaired, with the result that an inorganic-fiber heat-insulating sound-absorbing member to which the binder is applied in a homogeneous amount cannot be obtained. In addition to this, the number of portions at which inorganic fibers are not mutually bound with the binder increases, with the result that it sometimes becomes difficult to keep the shape as a product. Also in the colloidal dispersion and emulsion, once a film is formed as a result of volatilization of water serving as a medium, the film rarely returns to the aqueous material. If the binder attaches to e.g., production equipment, complicated work is required for washing, with the result that productivity tends to decrease.

In contrast, if the aqueous binder is a water soluble composition, even if water gradually volatiles from the aqueous binder, a film is not immediately formed. Thus, the aqueous binder is free from the above problem. Accordingly, it is preferable that the aqueous binder is prepared as a water soluble composition.

Although the emulsion or colloidal dispersion has the aforementioned problems, the emulsion or colloidal dispersion can be used in practice without problems by using it under humidified conditions or controlling the water content. For the reason, which one of an emulsion, a colloidal dispersion and a water soluble composition should be selected as the form of the aqueous binder may be appropriately determined in accordance with use environment of an aqueous binder.

The solid content of the aqueous binder is preferably 5 to 40 mass % and more preferably 10 to 30 mass %. If the solid content is set to be 5 mass % or more, the amount of water is proper, with the result that excessively much time is not required for a curing step and good productivity can be maintained. If the solid content is set to be 40 mass % or less, the fluidity of the binder can be prevented from decreasing. The solid content herein refers to a component, which does not vaporize when the aqueous binder is heated at 1 atm and a temperature from room temperature (about 23° C.) or more and 100° C. or less. Note that, it is preferable that the component (volatile component) except the solid content is water.

The inorganic-fiber heat-insulating sound-absorbing member according to the embodiment has an inorganic fiber and a cured product of an aqueous binder as mentioned above for fixing (keeping) the inorganic fiber. More specifically, the inorganic-fiber heat-insulating sound-absorbing member can be obtained by applying the aqueous binder to the inorganic fiber and curing the binder by heating to mold.

As the density of the inorganic-fiber heat-insulating sound-absorbing member, a density usually used for a heat insulating materials and sound absorbing materials may be employed and is preferably 5 to 300 kg/m$^3$.

The inorganic-fiber heat-insulating sound-absorbing member, can be produced, for example, as follows. More specifically, first, a molten inorganic raw material is fiberized by a fiberizing device. Immediately after that, an aqueous binder as mentioned above is applied to the inorganic fiber. Subsequently, the inorganic fibers to which the aqueous binder is applied are piled up on a perforated conveyor to form a bulky intermediary body of the inorganic-fiber heat-insulating sound-absorbing member and fed to e.g., a pair of upper and lower perforated conveyors providing a gap for obtaining a desired thickness. The intermediary body is heated while applying pressure to cure the aqueous binder. In this manner, the inorganic-fiber heat-insulating sound-absorbing member is formed. If necessary, the inorganic-fiber heat-insulating sound-absorbing member is coated with e.g., a surface covering material and cut into pieces having a desired width and length.

As the inorganic fiber, e.g., glass wool and rock wool, usually used in heat-insulating sound-absorbing materials can be used. As a method for fiberizing an inorganic fiber, various methods such as a flame method, a blowing-off method and a centrifugation method (also called as a rotary method) can be used. If the inorganic fiber is glass wool, it is preferable that a centrifugation method is employed.

As the timing at which an aqueous binder is applied to an inorganic fiber, any time after fiberization is acceptable. In order to efficiently apply the aqueous binder, immediately after fiberization is preferable for the application.

As a method for applying an aqueous binder to an inorganic fiber, a coating or spray method using e.g., a spray device, is mentioned. The amount of an aqueous binder applied is controlled in the same manner as in that for a conventional binder containing no water repellent. The amount of an aqueous binder applied, which varies depending upon the density and use of an inorganic-fiber heat-insulating sound-absorbing member, is preferably 0.5 to 15 mass % and more preferably 0.5 to 9 mass % in terms of solid content, based on the mass of the inorganic-fiber heat-insulating sound-absorbing member to which the aqueous binder was applied.

The inorganic fibers to which an aqueous binder is already applied by the above step are piled up on a perforated conveyor to obtain a bulky inorganic fiber intermediary body. Herein, it is preferable that when the inorganic fibers are piled up on the perforated conveyor, the fibers are vacuumed up by a suction device from the side of the surface of the perforated conveyor opposite to the surface on which the inorganic fibers are piled up.

As a method for heating an aqueous binder, for example, heating in a hot-air oven is mentioned. The heating temperature of the hot-air oven can be, for example, 200 to 350° C. The heat curing time can be appropriately controlled within the range of 30 seconds to 10 minutes depending upon the density and thickness of an inorganic-fiber heat-insulating sound-absorbing member.

An inorganic-fiber heat-insulating sound-absorbing member may be used as it is or coated with a surface covering material and put in use. As the surface covering material, paper, a synthetic resin film, a metal foil film, a nonwoven fabric, a woven fabric or a combination of these can be used.

The inorganic-fiber heat-insulating sound-absorbing member obtained in this manner has excellent compressive strength and durability. In addition, the binder does not release formaldehyde during thermal curing and thus reduces an environmental load compared to a conventional phenol/formaldehyde based binder.

In the above, the preferred embodiment of the present invention has been specifically described; however, the present invention is not limited to the above embodiment and can be modified in various ways.

There invention will be more specifically described by way of Examples below; however, the present invention is not limited to the following Examples.

Example 1

A polyacrylic acid (weight average molecular weight 8,000, acid value 660 mgKOH/g), which was obtained by radical polymerization using sodium hypophosphite as a chain transfer agent, was dissolved with water to obtain a resin solution (solid content 45%). One hundred parts by mass in terms of solid content of the resin solution, 0.60 parts by mass in terms of solid content of polyethyleneimine (weight average molecular weight 600, amine value 1120 mgKOH/g), 22.44 parts by mass in terms of solid content of diethanolamine and 4.0 parts by mass of sodium hypophosphite serving as a cure accelerator were mixed and the pH of the mixture was adjusted to be pH6.5 with a 25% ammonia water to obtain a water soluble composition. Further, 0.3 parts by mass of γ-aminopropyltriethoxysilane was added and the mixture was stirred. Thereafter, the mixture was diluted with water so as to obtain a solid content of 15%. Five parts by mass of a heavy oil dispersant in water having a solid content of 40% and 8.0 parts by mass of ammonium sulfate were added to obtain an aqueous binder. The ratio of the total mole of a hydroxyl group, an amino group and an imino group relative to the total mole of a carboxy group was 0.60. The ratio of the total mole of an amino group and an imino group relative to the total mole of a hydroxyl group, an amino group and an imino group was 0.35.

Example 2

An aqueous binder was obtained in the same manner as in Example 1 except that 5.56 parts by mass in terms of solid content of polyethyleneimine (weight average molecular weight 1800, amine value 1060 mgKOH/g) and 12.0 parts by mass in terms of solid content of diethanolamine were used. The ratio of the total mole of a hydroxyl group, an amino group and an imino group relative to the total mole of a carboxy group was 0.40. The ratio of the total mole of an amino group and an imino group relative to the total mole number of a hydroxyl group, an amino group and an imino group was 0.49.

Example 3

A polyacrylic acid (acid value 560 mgKOH/g, weight average molecular weight 3,500), which was obtained by radical polymerization using sodium hypophosphite as a chain transfer agent, was dissolved with water to obtain a resin solution (solid content 50%). One hundred parts by mass in terms of solid content of the resin solution, 8.89 parts by mass in terms of solid content of the polyethyleneimine (weight average molecular weight 1200, amine value 1060 mgKOH/g), 8.21 parts by mass in terms of solid content of the diethanolamine and 2.0 parts by mass of the sodium hypophosphite serving as a cure accelerator were mixed and the pH of the mixture was adjusted to be pH6.5 with a 25% ammonia water to obtain a water soluble composition. Further, 0.3 parts by mass of γ-aminopropyltriethoxysilane was added and the mixture was stirred. Thereafter, the mixture was diluted with water so as to obtain a solid content of 15%. Five parts by mass of a heavy oil dispersant in water having a solid content of 40% and 8.0 parts by mass of ammonium sulfate were added to obtain an aqueous binder. The ratio of the total mole of a hydroxyl group, an amino group and an imino group relative to the total mole of a carboxy group was 0.50. The ratio of the total mole of an amino group and an imino group relative to the total mole of a hydroxyl group, an amino group and an imino group was 0.61.

Example 4

A polyacrylic acid (acid value 720 mgKOH/g, weight average molecular weight 15,000), which was obtained by radical polymerization using sodium hypophosphite as a chain transfer agent, was dissolved with water to obtain a resin solution (solid content 40%). One hundred parts by mass in terms of solid content of the resin solution, 16.25 parts by mass in terms of solid content of polyethyleneimine (weight average molecular weight 600, amine value 1120 mgKOH/g), 16.23 parts by mass in terms of solid content of diethanolamine and 2.0 parts by mass of sodium hypophosphite serving as a cure accelerator were mixed and the pH of the mixture was adjusted to be pH6.5 with a 25% ammonia water to obtain a water soluble composition. Further, 0.3 parts by mass of γ-aminopropyltriethoxysilane was added and the mixture was stirred. Thereafter, the mixture was diluted with water so as to obtain a solid content of 15%. Five parts by mass of a heavy oil dispersant in water having a solid content of 40% and 8.0 parts by mass of ammonium sulfate were added to obtain an aqueous binder. The ratio of the total mole of a hydroxyl group, an amino group and an imino group relative to the total mole of a carboxy group was 0.60. The ratio of the total mole of an amino group and an imino group relative to the total mole of a hydroxyl group, an amino group and an imino group was 0.61.

Comparative Example 1

A binder was obtained in the same manner as in Example 1 except that the polyethyleneimine was not added and 43.5 parts by mass in terms of solid content of the diethanolamine was added. The ratio of the total mole of a hydroxyl group, an amino group and an imino group relative to the total mole of a carboxy group was 1.00. The ratio of the total mole of an amino group and an imino group relative to the total mole of a hydroxyl group, an amino group and an imino group was 0.33.

Comparative Example 2

A binder was obtained in the same manner as in Example 1 except that 0.36 parts by mass in terms of solid content of the polyethyleneimine and 8.42 parts by mass in terms of solid content of the diethanolamine were used. The ratio of the total mole of a hydroxyl group, an amino group and an imino group relative to the total mole of a carboxy group was 0.22. The ratio of the total mole of an amino group and an imino group relative to the total mole of a hydroxyl group, an amino group and an imino group was 0.35.

Comparative Example 3

A binder was obtained in the same manner as in Example 1 except that 16.20 parts by mass in terms of solid content of the polyethyleneimine and 34.91 parts by mass in terms of solid content of the diethanolamine were used. The ratio of the total mole of a hydroxyl group, an amino group and an imino group relative to the total mole of a carboxy group was 1.16. The ratio of the total mole of an amino group and an imino group relative to the total mole of a hydroxyl group, an amino group and an imino group was 0.49.

Comparative Example 4

A binder was obtained in the same manner as in Example 1 except that 19.84 parts by mass in terms of solid content of the polyethyleneimine and 3.92 parts by mass in terms of solid content of the diethanolamine were used. The ratio of the total mole of a hydroxyl group, an amino group and an imino group relative to the total mole of a carboxy group was 0.6. The ratio of the total mole of an amino group and an imino group relative to the total mole of a hydroxyl group, an amino group and an imino group was 0.85.

Comparative Example 5

A polyacrylic acid (acid value 720 mgKOH/g, weight average molecular weight 15,000), which was obtained by radical polymerization of acrylic acid using sodium hypophosphite as a chain transfer agent, was dissolved with water to obtain a resin solution (solid content 40%). One hundred parts by mass in terms of solid content of the resin solution, 15.52 parts by mass in terms of solid content of polyethyleneimine having a weight average molecular weight 3200 and an amine value 1025 mgKOH/g, 16.23 parts by mass in terms of solid content of diethanolamine as an alkanolamine and 2.0 parts of sodium hypophosphite serving as a cure accelerator were mixed and the pH of the mixture was adjusted to be pH6.5 with a 25% ammonia water to obtain a water soluble composition. Further, 0.3 parts of γ-aminopropyltriethoxysilane was added as a silane coupling agent and the mixture was stirred. Thereafter, the mixture was diluted with water so as to obtain a solid content of 15%. Five parts of a heavy oil dispersant in water having a solid content of 40%/o and 8.0 parts by mass of ammonium sulfate were added to obtain an aqueous binder for an inorganic-fiber according to Comparative Example 5. In the binder, the ratio of the total mole of an amino group, an imino group and a hydroxyl group relative to the total mole of a carboxy group was 0.56. The ratio of the total mole of an amino group and an imino group relative to the total mole of an amino group, an imino group and a hydroxyl group was 0.60.

[Evaluation on Compressive Strength]

To glass fibers fiberized by a centrifugation method, the binders of Examples and Comparative Examples were individually applied by a spray so as to obtain a predetermined application amount. The glass fibers were each individually piled up on a perforated conveyor while vacuuming by a suction device to obtain intermediary bodies of inorganic-fiber heat-insulating sound-absorbing members. The intermediary bodies were each heated in hot air of 260° C. for 5 minutes to cure the binder to obtain inorganic-fiber heat-insulating sound-absorbing members (glass wool board) having a density of 24 kg/m$^3$, a length of 1350 mm, a width of 430 mm, a thickness of 80 mm and a binder application amount of 8.0%. Measurement of 10% compressive load was carried out in the thickness direction of the glass wool boards obtained at a rate of 1 m/minute. The results are shown in Table 1 and Table 2. Note that, in the glass wool board using the binder of Comparative Example 2, stain due to binder adhesion and deposition of inorganic fibers were frequently observed on the perforated conveyor on which the intermediary body of the inorganic-fiber heat-insulating sound-absorbing member is formed.

[Evaluation on Durability]

From each of the glass wool boards prepared as mentioned above, test pieces of 300 mm-squares having a thickness of 80 mm were cut out. After the test pieces were allowed to stand still in high temperature and high pressure vapor (temperature 105° C., pressure 35 kPa) for one hour, difference in thickness was determined. A change rate relative to the initial thickness was obtained. The results are shown in Table 1 and Table 2.

TABLE 1

|  | Example 1 | Example 2 | Example 3 | Example 4 |
|---|---|---|---|---|
| 10% Compressive strength (Kg/m$^2$) | 88.0 | 86.7 | 87.5 | 87.9 |
| Durability (%) | 3.8 | 4.3 | 3.8 | 3.7 |

TABLE 2

|  | Comparative Example 1 | Comparative Example 2 | Comparative Example 3 | Comparative Example 4 | Comparative Example 5 |
|---|---|---|---|---|---|
| 10% Compressive strength (Kg/m$^2$) | 73.6 | 71.0 | 79.4 | 87.2 | 81.8 |
| Durability (%) | 4.4 | 6.5 | 5.7 | 5.9 | 5.8 |

What is claimed is:

1. An aqueous binder for an inorganic-fiber heat-insulating sound-absorbing member, comprising a polycarboxylic acid and a crosslinking agent for the polycarboxylic acid, wherein
the polycarboxylic acid comprises a polycarboxylic acid having a weight average molecular weight of 1000 to 20000 and an acid value of 500 to 900 mgKOH/g,
the crosslinking agent comprises a branched polyethyleneimine having a weight average molecular weight of 300 to 2000, and an alkanolamine having a lower molecular weight than the polyethyleneimine and an alcohol valence of 2 or less,
a ratio of the total mole of the hydroxyl group, amino group and imino group in the crosslinking agent relative to the mole of the carboxyl group in the polycarboxylic acid is 0.30 to 0.75, and
a ratio of the total mole of the amino group and imino group in the crosslinking agent relative to the total mole of the hydroxyl group, amino group and imino group in the crosslinking agent is 0.34 to 0.80.

2. The aqueous binder according to claim 1, wherein the polycarboxylic acid comprises as a monomer unit an ethylenically unsaturated monomer having a carboxy group.

3. The aqueous binder according to claim 1 or 2, wherein the alkanolamine is a dialkanolamine having alkanol moieties, each of the alkanol moieties consisting of 1 to 6 carbon atoms.

4. The aqueous binder according to claim 1 or 2, further comprising at least one selected from the group consisting of a cure accelerator, a silane coupling agent, a dust-inhibiting agent, a neutralizer and a colorant.

5. An inorganic-fiber heat-insulating sound-absorbing member comprising an inorganic fiber and a cured product of the aqueous binder according to claim 1 or 2 for fixing the inorganic fiber.

* * * * *